(12) United States Patent
Higashi et al.

(10) Patent No.: US 9,851,001 B2
(45) Date of Patent: Dec. 26, 2017

(54) DRIVE UNIT FOR VEHICLES

(71) Applicant: TOYOTA JIDOSHA KABUSHIKI KAISHA, Toyota-shi (JP)

(72) Inventors: Hideyuki Higashi, Toyota (JP); Kozo Yamamoto, Toyota (JP); Kazutoshi Motoike, Toyota (JP); Tetsuya Kohno, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 42 days.

(21) Appl. No.: 14/760,860

(22) PCT Filed: Jun. 11, 2013

(86) PCT No.: PCT/JP2013/066112
§ 371 (c)(1),
(2) Date: Jul. 14, 2015

(87) PCT Pub. No.: WO2014/119024
PCT Pub. Date: Aug. 7, 2014

(65) Prior Publication Data
US 2015/0354693 A1 Dec. 10, 2015

(30) Foreign Application Priority Data
Feb. 4, 2013 (JP) .................. 2013-019130

(51) Int. Cl.
*F16H 57/04* (2010.01)
*F16H 57/027* (2012.01)
*F16H 57/02* (2012.01)

(52) U.S. Cl.
CPC ....... *F16H 57/0483* (2013.01); *F16H 57/027* (2013.01); *F16H 57/0423* (2013.01); *F16H 57/0457* (2013.01); *F16H 2057/02052* (2013.01)

(58) Field of Classification Search
CPC .................................................... F16H 57/042
See application file for complete search history.

(56) References Cited

U.S. PATENT DOCUMENTS

| 4,586,395 A | 5/1986 | Fukuchi et al. |
| 2006/0048600 A1* | 3/2006 | Taguchi ............. F16H 57/0483 74/607 |

(Continued)

FOREIGN PATENT DOCUMENTS

| JP | 50 103322 | 8/1975 |
| JP | 54 88728 | 6/1979 |

(Continued)

OTHER PUBLICATIONS

International Search Report and Written Opinion of the International Searching Authority (with partial English translation) dated Sep. 3, 2013 in PCT/JP2013/066112 Filed Jun. 11, 2013.

*Primary Examiner* — Derek D Knight
*Assistant Examiner* — Timothy M Hannon
(74) *Attorney, Agent, or Firm* — Oblon, McClelland, Maier & Neustadt, L.L.P.

(57) ABSTRACT

A drive unit for vehicles that prevents a blow out of lubrication oil from a breather during splash lubrication is provided. A partition plate is disposed along a flat face of a ring gear to divide an inner space of the chamber into a first reservoir in which the ring gear is disposed, and a second reservoir to which the lubrication oil partially flows thereinto to return to an oil pan. The partition plate comprises a main body disposed between the flat face of the ring gear and an inner face of the chamber opposed thereto, and a bent portion formed on an upper end of the main body to guide the lubrication oil scattered upwardly by a rotation of the ring gear in a direction away from the breather.

7 Claims, 3 Drawing Sheets

(56) References Cited

U.S. PATENT DOCUMENTS

| | | | | |
|---|---|---|---|---|
| 2008/0041179 A1* | 2/2008 | Yasui | .................... | F16H 57/027 |
| | | | | 74/467 |
| 2011/0011204 A1 | 1/2011 | Ueno et al. | | |
| 2011/0245009 A1* | 10/2011 | Shibayama | ......... | F16H 57/0457 |
| | | | | 475/160 |
| 2012/0096968 A1* | 4/2012 | Kawamoto | ......... | F16H 57/0409 |
| | | | | 74/467 |
| 2012/0178571 A1* | 7/2012 | Yoshimi | .................. | F16H 3/006 |
| | | | | 475/6 |

FOREIGN PATENT DOCUMENTS

| | | |
|---|---|---|
| JP | 59 174450 | 11/1984 |
| JP | 60 128058 | 8/1985 |
| JP | 61 157749 | 9/1986 |
| JP | 2007 113636 | 5/2007 |
| JP | 2011 21663 | 2/2011 |
| JP | 2014-111964 A | 6/2014 |

* cited by examiner

DRIVE UNIT FOR VEHICLES

TECHNICAL FIELD

The present invention relates to a drive unit for vehicles, and more particularly, to a structure for lubricating a differential of a transaxle formed by integrating a transmission and a differential.

BACKGROUND ART

In a vehicle, a differential unit is employed to allow right and left driving wheels to rotate at different speeds. A structure of the differential unit used generally will be explained briefly hereafter. A pair of side gears such as bevel gears is disposed in a differential case while being opposed to each other, and a pinion gear is interposed between those side gears. The pinion gear is rotatably mounted on a pinion pin arranged perpendicular to a rotational center axis of the side gears while connected to the differential case. Additionally, a ring gear is arranged around the differential case while meshing with an output gear of a transmission, and power of the transmission is transmitted to the differential unit through the ring gear. The right and left side gears are individually connected to a drive shaft, and power is transmitted to the driving wheels therethrough.

As described above, said differential unit is mainly composed of the gears to differentiate the rotational speeds of the right and left wheels while increasing a reduction ratio, and therefore subjected to a large torque during running. For this reason, sufficient lubrication is required for the differential unit. As described, the transaxle is formed by integrating the differential unit and the transmission having an oil pump. Therefore, the differential unit of the transaxle may be lubricated by oil discharged from the oil pump during propelling the vehicle by a prime mover such as an engine. For example, Japanese Patent Laid-Open No. 2007-113636 describes a differential device for vehicle in which lubricating oil pressurized by an oil pump is injected to an oil hole of a differential case. An oil passage for letting through the lubricating oil is surrounded by a separate plate and ribs formed on an inner side wall of the differential housing. The differential plate is arranged to divide into an agitating section where the lubricating oil agitated by a ring gear of the differential is temporarily reserved, and a reservoir section where the lubricating oil lifted by the ring gear is reserved. Owing to the separate plate thus formed, an amount of the lubrication oil will not be increased excessively, and an increment of a agitation resistance will be suppressed.

In the device taught by the Japanese Patent Laid-Open No. 2007-113636, the oil pump is driven by the engine during propulsion of the vehicle so that the differential unit can be lubricated forcibly by the lubrication oil discharged from the oil pump. Even when the vehicle is towed without activating the engine so that the differential unit is rotated by rotations of the driving wheels, the differential unit may also be lubricated ceaselessly by the lubricating oil lifted from the agitating section by the rotating ring gear to be delivered to the differential case through the reservoir section. By such splash lubrication, the lubricating oil is centrifugally scattered by the rotation of the ring gear and reaches higher portion in the differential housing with an increase in the rotational speed of the ring gear. In order to lubricate the remaining portion in the differential housing other than the differential gear unit comprising the ring gear and the side gears when the vehicle is towed, the transaxle has to be modified to apply the lubricating oil scattered by the rotation of the ring gear to the highest portion in the differential housing.

A temperature in the differential housing or a transmission housing integrated therewith is raised by heat resulting from friction between gear tooth surfaces or friction in bearings, and consequently an internal pressure thereof is raised. If the internal pressure of the housing is raised excessively, a sealing member may be damaged to cause oil leakage. In order to avoid such disadvantage, a breather is formed on a relatively higher place of the housing to provide a communication between an inner space of the housing and the outside thereby depressurizing the housing. In the foregoing transaxle, the breather is formed on a junctional region between the differential housing (or a transaxle case) and the transmission housing or in the vicinity thereof so as to release the internal pressure of each housing to the outside. Given that the lubricating oil adheres to the breather or the vicinity thereof, the lubrication oil may blow out of the breather together with the air. In order to prevent an intrusion of the lubrication oil into the breather, a labyrinthine structure may be arranged on an inner opening of the breather of the housing.

In the differential device taught by Japanese Patent Laid-Open No. 2007-113636 adapted to perform the splash lubrication, the housing may be lubricated sufficiently by scattering the lubricating oil to near the highest place of the housing. However, the lubricating oil would be delivered excessively to the vicinity of the breather. In this situation, the lubricating oil may blow out of the breather together with the internal air with a pressure rise in the housing.

DISCLOSURE OF THE INVENTION

The present invention has been conceived noting the foregoing technical problems, and it is therefore an object of the present invention is to provide a drive unit for vehicles in which oil leakage out of a breather resulting from a splash lubrication can be reduced.

The present invention is applied to a drive unit for vehicles having a differential gear unit held in a chamber, and a breather formed above the chamber and a ring gear of the differential gear unit to emit air in the chamber to outside. The ring gear is at least partially contacted to lubrication oil in the chamber. In order to achieve the above-mentioned object, according to the present invention, a partition plate is disposed along a flat face of the ring gear to divide an inner space of the chamber into a first reservoir in which the ring gear is disposed, and a second reservoir to which the lubrication oil partially flows thereinto to return to an oil pan. Specifically, the partition plate comprises a main body that is disposed between the flat face of the ring gear and an inner face of the chamber opposed thereto, and a bent portion that is formed on an upper end of the main body to guide the lubrication oil scattered upwardly by a rotation of the ring gear in a direction away from the breather.

The partition plate may comprise a through hole that allows the lubrication oil centrifugally scattered from the ring gear to enter into the second reservoir.

Specifically, the through hole is formed on a portion of the main body opposed to an upper portion of the flat face of the ring gear.

In order to cover a circumferential face of the ring gear from outside, the bent portion is formed in such a manner to obliquely cross a plane perpendicular to a rotational center axis of the ring gear The drive unit for vehicles is further comprised of a transmission that transmits power to the differential gear unit, and a casing that is integrated with the chamber to hold the transmission.

In addition, the chamber comprises a transaxle casing and a transaxle housing joined thereto, the breather is formed in the vicinity of a junctional region between the transaxle casing and the transaxle housing, and the bent portion is formed in such a manner that the junctional region is protected from the lubrication oil scattering from the ring gear.

Thus, in the drive unit according to the present invention, the ring gear is contacted to the lubrication oil in the first reservoir. The lubrication oil is scattered upwardly by a rotation of the ring gear but guided by the bent portion formed on the partition plate in a direction away from the breather. According to the present invention, therefore, the lubrication oil will not adhere excessively to the breather or a vicinity thereof even if the ring gear is rotated at high speed so that oil leakage from the breather can be prevented. In addition, an excessive delivery of the lubrication oil to the first reservoir is prevented by the partition plate so that a power loss resulting from agitating the lubrication oil as well as deterioration of the lubrication oil can be prevented. Nonetheless, a proper amount of the lubrication oil is allowed to return to the oil pan through the second reservoir.

Specifically, the lubrication oil scattered by the ring gear is allowed to flow partially into the second reservoir through the through hole so that shortage of the lubrication oil in the oil pan can be prevented. For this reason, undesirable air suction of the oil pump can be prevented.

DETAILED DESCRIPTION OF THE PREFERRED EMBODIMENT(S)

Figure 2:
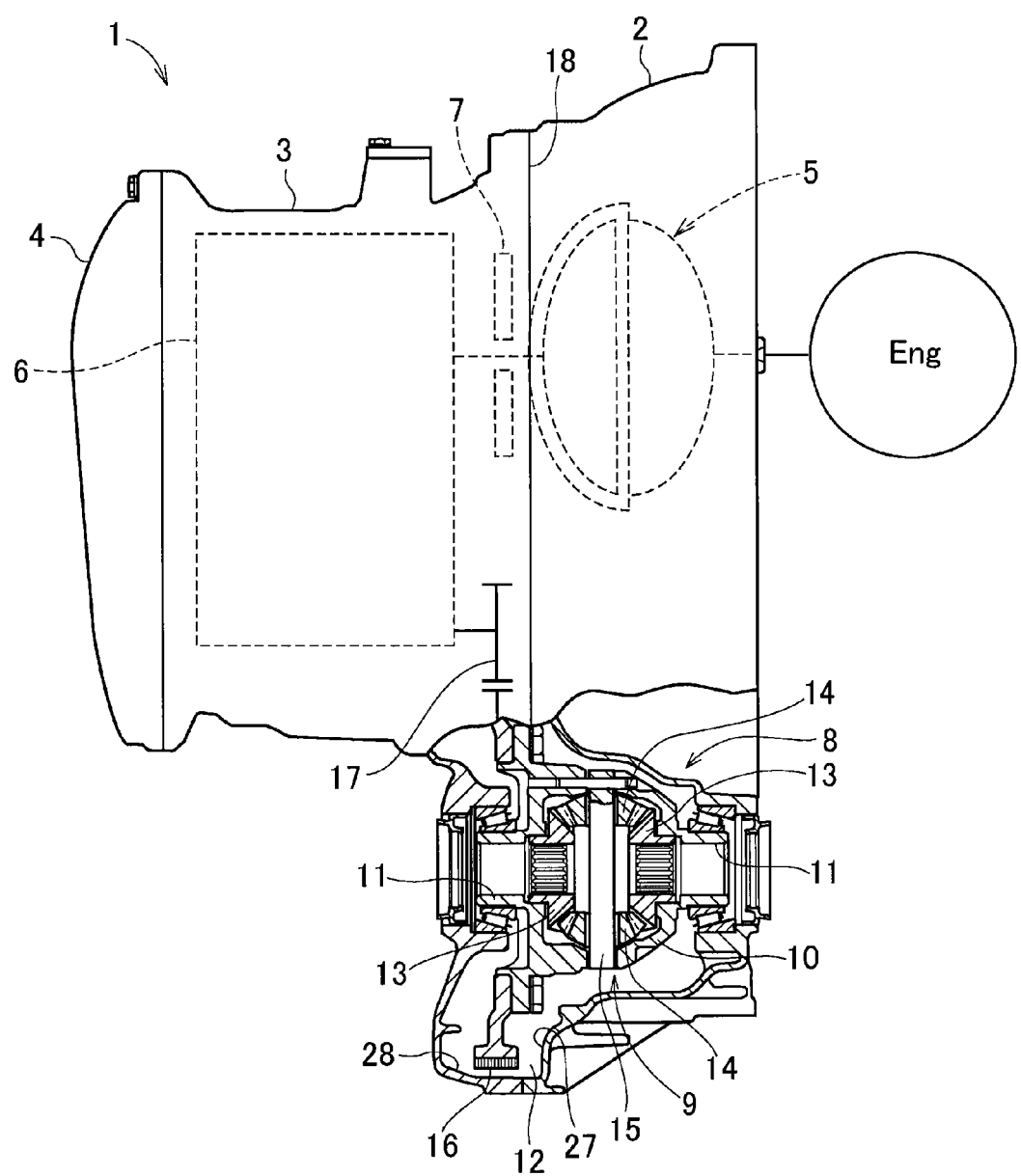
FIG. 2 is a fractured side view schematically showing the drive unit according to the preferred example.

Hereinafter, a preferred example of the present invention will be explained with reference to the accompanying drawings. The drive unit of the present invention is adapted to transmit power of the a prime mover of a vehicle such as an engine to driving wheels while distributing torque to the right and left wheels and allowing those wheels to rotate at different speeds. In addition, the drive unit also have a speed change function. Specifically, the drive unit of the present invention is an transaxle formed by combining a transmission adapted to change a transmission torque or a rotational speed with a differential unit adapted to distribute torque transmitted from the transmission to the driving wheels while allowing the driving wheels to rotate at different speeds. Referring now to FIG. 2, there is schematically shown one example of a transaxle 1. The transaxle 1 shown therein is comprised of a transaxle housing (to be simply called as the "housing" hereinafter) 2 that is connected to a prime mover Eng such as an engine, a transaxle casing (to be simply called as the "casing" hereinafter) 3 that is jointed to the housing 2, and a transaxle rear cover (to be simply called as the "rear cover" hereinafter) 4 that closes a rear end of the casing 3. Thus, the housing 2, the casing 3 and the rear cover 4 forms a sealed housing, and the below-mentioned devices are held therein.

According to the preferred example, a torque converter 5 is held in the casing 2, and a transmission 6 is held in the casing 3. The torque converter 5 is a conventional fluid coupling in which a turbine runner as an output member is rotated by a spiral oil flow created by a pump impeller as an input member connected to an oil pump 7. The oil pump 7 is activated by the prime mover Eng to establish hydraulic pressure, whereas deactivated to be disabled to establish hydraulic pressure when the vehicle is towed while stopping the prime mover Eng. The transmission 6 is adapted to change a ratio of an output speed to an input speed (i.e., a speed ratio) arbitrarily. For example, a conventional transmission such as a belt-driven continuously variable transmission, a geared transmission comprised of a plurality of planetary gear sets, a geared transmission comprised of a plurality of gear trains, a toroidal continuously variable transmission and so on may be used as the transmission 6.

A differential unit 8 is also arranged in the transaxle 1 together with the torque converter 5, the transmission 6, and the oil pump 7. The differential unit 8 is comprised of a differential gear unit 9 adapted to distribute the torque of the transmission 6 to the right and left driving wheels (e.g., to the right and left front wheels). The differential gear unit 9 includes a hollow differential casing 10, and a pair of boss portions 11 is formed coaxially on the differential casing 10 to protrude away from each other. One of the boss portions 11 is supported by the housing 2 through the bearing, and the other boss portion 11 is supported by the casing 3 through the other bearing. As described, the housing 2 and the casing 3 are joined together to form a chamber 12, and the differential gear unit 9 is held therein.

In the differential casing 10, a pair of side gears 13 is arranged coaxially on the center axis of the boss portions 11 while being opposed to each other. Specifically, each side gears 13 is a bevel gear having an inner spline along the rotational center axis, and individually fitted onto a drive shaft (not shown). Pinion gears 14 are fitted onto a pinion pin 15 extending along a common rotational center axis thereof to be interposed between the side gears 13 while meshing therewith, and both ends of the pinion pin 15 are attached to the differential casing 10 so that the pinion gears 14 are individually allowed to rotate and revolve. In addition, a ring gear 16 as a helical gear is arranged around an outer face of the differential casing 10 while meshing with an output gear (or a reduction gear) 17 of the transmission 6.

Specifically, the ring gear 16 is disposed near the opening ends of the housing 2 and the casing 3, that is, a mating face (i.e., a junctional region therebetween) 18 of the housing 2 and the casing 3. A breather 19 is formed in the vicinity of the junctional region 18 between the housing 2 and the casing 3 above the ring gear 16. As a conventional breather of transmissions, the breather 19 is arranged to prevent an excessive pressure rise by letting out the air. To this end, the breather 19 is provided with a cap 20 applied to an opening thereof, and a breathing chamber 21 connected to the opening that is formed on an uppermost portion of the junctional region 18. Each housing 2 and casing 3 is a high pressure die casting article made of e.g., aluminum alloy having a drafted surface on its opening end and hence the junctional region 18 therebetween and the vicinity thereof bulges outwardly. That is, the breathing chamber 21 is formed at the junctional region 18 that is the highest place in the housing 2 and the casing 3.

Figure 3:
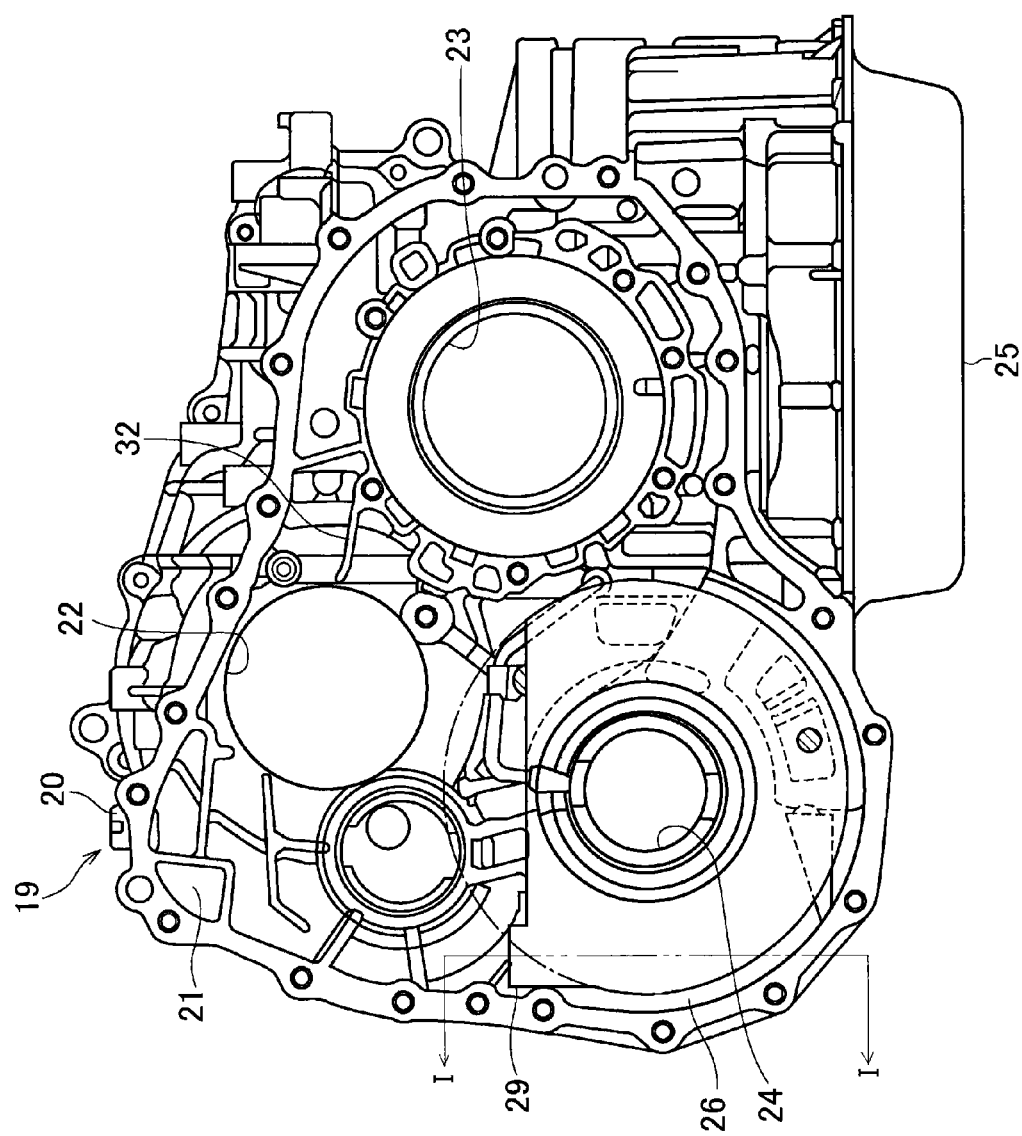
FIG. 3 is a side view showing a side of the housing seen from the casing.

Turning to FIG. 3, there is shown a location of the ring gear 16. Specifically, FIG. 3 is a side view of the housing 2 detached from the casing 3 viewed from the casing 3 side. In the example shown therein, a belt-driven continuously variable transmission serves as the transmission 6. As can be seen, a shaft hole 23 to which a secondary pulley shaft (not shown) is inserted is formed diagonally underneath a shaft hole 22 to which an input shaft (not shown) is inserted, and a shaft hole 24 for the differential unit 8 is formed diagonally underneath the shaft hole 23. An oil pan 25 is disposed on the lowest position in the housing 2 so that lubrication oil in the transaxle 1 gravitationally falls to the oil pan 25, and then the oil is pumped up by the oil pump 7.

The oil pumped up by the oil pump 7 is used not only to establish an operational pressure for actuators or a signal pressure, but also as the lubrication oil. As described, the chamber 12 holding the ring gear 16 is situated above the oil pan 25 so that most of the drained oil and the lubrication oil fall toward the oil pan 25 through the chamber 12 and a vicinity thereof. As also described, the ring gear 16 is adapted to lift the (lubrication) oil held in the chamber 12. In order to restrict an amount of the lubrication oil lifted by the ring gear 16 for the purpose of decreasing a resistance of agitating the lubrication oil by the ring gear 16, the transaxle 1 is provided with a differential plate (i.e., the claimed partition plate) 26.

According to the preferred example, the chamber 12 is formed by combining the housing 2 with the casing 3, and the oil pan 25 is disposed below the casing 3. The differential plate 26 is disposed between the ring gear 16 and an inner face of the casing 3 opposed to a flat face of the ring gear 16. A clearance between the differential plate 26 and the ring gear 16 serves as a first reservoir 27 in which the lubrication oil agitated or lifted by the ring gear stays temporarily, and a clearance between the differential plate 26 and the inner surface of the casing 3 serves as a second reservoir 28 into which the lubrication oil returning to the oil pan 25 flows partially. Thus, part of the lubrication oil flowing down from above the ring gear 16 is allowed to flow into the second reservoir 28 without being brought into substantial contact to the ring gear 16 so that an amount of the lubrication oil agitated or lifted by the ring gear 16 can be limited. Consequently, the agitation resistance of the lubrication oil is decreased while ensuring a sufficient amount of the oil returning to the oil pan 25.

The differential plate 26 is a ring shaped plate member situated between the flat face of the ring gear 16 and the inner face of the casing 3 covering the lower part of the flat face of the ring gear 16. The differential plate 26 is attached to the casing 3 by fitting onto a cylinder potion projecting from the inner face of the casing 3 to support one of the boss portions 11 of the differential casing 10. A shape of an upper end of the differential plate 26 may be altered arbitrarily unless brought into contact to other members such as the housing 2, the casing 3 and so on, and unless the lubrication oil is not hindered to flow or fly. In the example shown in FIG. 3, upper end of the differential plate 26 is cut to form a flat side.

Figure 1:
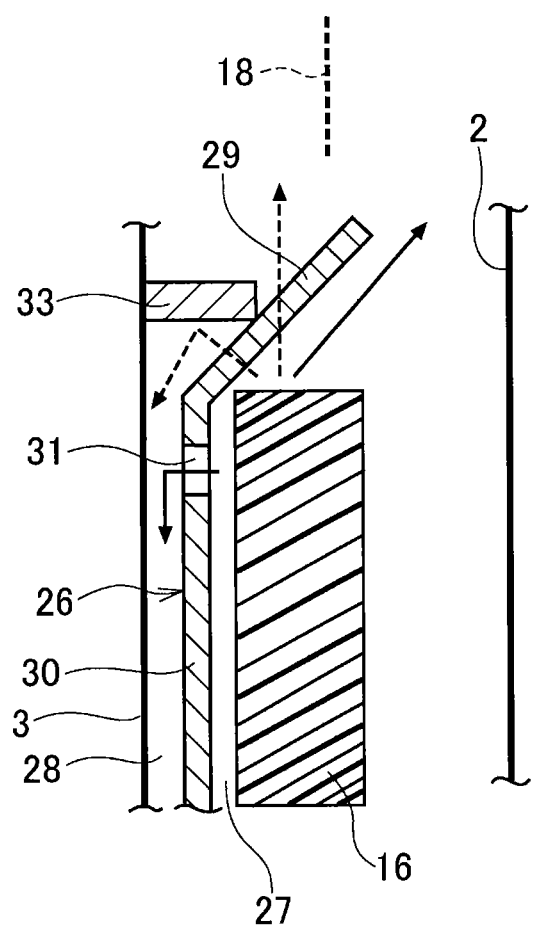
FIG. 1 a cross-sectional view showing a cross-section of a configuration of the differential plate of the drive unit according to the preferred example along I-I line shown in FIG. 3.

In order to block the lubrication oil centrifugally scattered from an upper portion of the rotating ring gear 16 toward the breather 19 or the junctional region 18 during propulsion of the vehicle in the forward direction, the upper end of the differential plate 26 is partially bent to form a bent portion 29 in the vicinity of the upper portion of the rotating ring gear 16. Specifically, a main body 30 of the differential plate 26 covers the flat face of the ring gear 16, and the bent portion 29 is formed on an upper end of the main body 30. That is, the bent portion 29 covers the upper portion of the outer circumference of the ring gear 16 in such a manner that the lubrication oil scattering upwardly from the ring gear 16 collides into the bent portion 29. A configuration of the bent portion 29 is schematically illustrated in FIG. 1, and as can be seen from FIG. 1, the bent portion 29 extends obliquely upwardly from the main body 30 to cover the outer circumference of the ring gear 16 from above. In other words, the bent portion 29 is formed in a manner to obliquely cross a plane perpendicular to a rotational center axis of the ring gear 16. Thus, the junctional region 18 can be protected from the lubrication oil scattering upwardly from the ring gear 16 by the bent portion 29.

In addition, according to the example shown in FIG. 1, a through hole 31 is formed to allow the lubrication oil scattering from the ring gear 16 to enter into the second reservoir 28 therethrough. In order to allow the lubrication oil scattering from the ring gear 16 to enter into the second reservoir 28 as much as possible, the through hole 31 is preferably formed by boring or drilling an upper portion of the main body 30 slightly below the bent portion 29.

In FIG. 3, a reference number 32 represents a lubrication chamber. The lubrication chamber 32 is formed by a rib formed on an inner face of the housing 2 or the casing 3 so as to receive the lubrication oil flies from the ring gear 16 when the vehicle is towed and then falls thereto. Although not especially illustrated, the lubrication chamber 32 is brought into communication with an oil passage to deliver the lubrication oil therefrom to a site in need of the lubrication oil such as bearing and tooth surfaces. In FIG. 1, a reference number 33 represents a rib protruding inwardly from the casing 3 to reinforce the casing 3.

Next, advantages of the drive unit will be explained hereinafter. When the vehicle is powered by the prime mover such as an engine, the oil pump 7 is driven by the power of the prime mover to establish hydraulic pressure so that the transmission 6 and the differential unit 8 are forcibly lubricated by the lubrication oil delivered thereto. Especially, sufficient amount of the oil is delivered to bearings and gear teeth in the differential unit 8, and then falls toward a bottom of the chamber 12. In this situation, the oil falling through the first reservoir 27 is scattered again by the ring gear 16 for the purpose of lubrication. As a result, an oil level in the first reservoir 27 is lowered so that an allowable space for the oil to enter into the first reservoir 27 is created in first reservoir 27. In this situation, however, the oil falling through the second reservoir 28 is prevented to enter into the first reservoir 27 by the differential plate 26. For this reason, the oil will not be introduced excessively to the first reservoir 27 to prevent an excessive increment of the resistance to agitate the oil by the ring gear 16. Meanwhile, sufficient amount of the lubrication oil can be returned to the oil pan 25 through the second reservoir 28 to prevent an excessive fall of oil level in the oil pan 25, and hence air will not be introduced undesirably into the oil pump 7.

In addition, the oil scattered upwardly by the ring gear 16 is blocked by the bent portion 29 or otherwise guided by the bent portion 29 to fly obliquely upwardly. That is, delivery of the lubrication oil flying toward the junctional region 18 or the breather 19 is limited. For this reason, an amount of the lubrication oil adhering to the vicinity of the breather 19 or the breather chamber 21 is reduced so that blow out of the lubrication oil can be prevented even when the air is emitted from the breather 19 by a pressure rise in the chamber 12. The oil scattered upwardly by the ring gear 16 flows partially into the second reservoir 28 through the through hole 31 formed on the differential plate 26 and then falls toward the oil pan 25 without contacting to ring gear 16. For this reason, sufficient amount of the lubrication oil can be returned to the oil pan 25 through the second reservoir 28 to prevent shortage of the oil therein.

When the vehicle is towed while stopping the prime mover such as the engine, the oil pump 7 is deactivated to be disabled to establish hydraulic pressure but the differential unit 8 still can be lubricated by the oil scattered by a rotation of the ring gear 16. As described, the lubricating oil is centrifugally scattered by the rotation of the ring gear and reaches higher level with an increase in the rotational speed of the ring gear 16. In this case, however, the bent portion 29 protects the junctional region 18 and the breather 19 from the lubrication oil scattering upwardly from the ring gear 16 so that an excessive adhesion of the lubrication oil in the vicinity of the breather 19 can be prevented. Accordingly, blow out of the lubrication oil from the breather 19 resulting from a pressure rise in the chamber 12 will not be caused. In addition, the lubrication oil scattering from the ring gear 16 partially flows into the second reservoir 28 through the through hole 31 formed on the differential plate 26 to return to the oil pan 25 so that the lubrication oil can be reserved sufficiently in the oil pan 25 to prevent shortage of the oil therein. For this reason, the oil pump 7 can be prevented from undesirably sucking air thereinto when it is reactivated.

In the preferred example, the main body 30 and the bent portion 29 of the differential plate 26 have flat configurations. However, a surface of those elements may be curved along a contour of the inner face of the casing 3 or the differential case 10. In addition, the differential unit 8 may be lubricated only by the splash lubrication without activating the hydraulic source.

The invention claimed is:

1. A drive unit for vehicles, comprising:
   a chamber comprising a transaxle casing and a transaxle housing joined thereto;
   a differential gear unit that is held in the chamber; and
   a breather that is formed above the chamber and a ring gear of the differential gear unit to emit air in the chamber to outside the chamber;
   wherein the ring gear is at least partially contacted to lubrication oil in the chamber;
   the drive unit further comprising a partition plate that is disposed along a first flat face of the ring gear to divide an inner space of the chamber into a first reservoir in which the ring gear is disposed, and a second reservoir to which the lubrication oil partially flows thereinto to return to an oil pan;
   wherein the partition plate comprises:
      a main body that is disposed between the first flat face of the ring gear and an inner face of the chamber opposed thereto, and
      a bent portion that extends from an upper end of the main body in such a manner to obliquely cross a plane perpendicular to a rotational center axis of the ring gear, that extends toward a second flat face of the ring gear opposite to the first flat face to fully cover an outer circumferential face of the ring gear in an axial direction of the ring gear, that crosses a radial plane extending from the second flat face, and that guides the lubrication oil scattered upwardly by a rotation of the ring gear in a direction away from the breather.

2. The drive unit for vehicles as claimed in claim 1, wherein the breather is formed at a junctional region between the transaxle casing and the transaxle housing.

3. The drive unit for vehicles as claimed in claim 1, wherein the partition plate comprises a through hole that allows the lubrication oil centrifugally scattered from the ring gear to enter into the second reservoir.

4. The drive unit for vehicles as claimed in claim 3, wherein the through hole is formed on a portion of the main body opposed to an upper portion of the first flat face of the ring gear.

5. The drive unit for vehicles as claimed in claim. 1, further comprising:
   a transmission. that transmits power to the differential gear unit; and
   wherein the transmission is held in the transaxle casing forming the chamber.

6. The drive unit for vehicles as claimed in claim 2, wherein the bent portion is formed in such a manner that the junctional region is protected from the lubrication oil scattering from the ring gear.

7. The drive unit for vehicles as claimed in claim 1, wherein the bent portion is between the ring gear and the breather in a radial direction of the ring gear.

* * * * *